United States Patent [19]

Zurn

[11] Patent Number: 4,649,259

[45] Date of Patent: Mar. 10, 1987

[54] DEVICE FOR WELDING FOILS HAVING DIFFERENT THICKNESS ALONG A WELD LINE

[75] Inventor: Karl Zurn, Rosengarten-Westheim, Fed. Rep. of Germany

[73] Assignee: Optima-Maschinenfabrik Dr. Buhler GmbH & Co., Fed. Rep. of Germany

[21] Appl. No.: 709,337

[22] Filed: Mar. 7, 1985

[30] Foreign Application Priority Data

Mar. 10, 1984 [DE] Fed. Rep. of Germany ....... 3408901

[51] Int. Cl.$^4$ .................... H05B 3/00; B65B 51/14; B30B 15/34
[52] U.S. Cl. .................... 219/243; 156/583.1; 156/583.9; 219/221; 219/228
[58] Field of Search .................... 219/243, 228, 221; 156/583.1, 583.9

[56] References Cited

U.S. PATENT DOCUMENTS

| | | | |
|---|---|---|---|
| 2,489,643 | 11/1949 | Hunter | 219/243 |
| 2,802,086 | 8/1957 | Fener | 219/243 X |
| 3,005,402 | 10/1961 | Starger et al. | 219/243 X |
| 3,095,492 | 6/1963 | Gaiennie | 219/243 |
| 3,196,068 | 7/1965 | Schoder et al. | 156/583.9 |
| 3,624,836 | 11/1971 | Rohdin | 219/243 |
| 4,412,123 | 10/1983 | Ammann et al. | 219/243 X |

FOREIGN PATENT DOCUMENTS

| | | | |
|---|---|---|---|
| 3024517 | 1/1982 | Fed. Rep. of Germany . | |
| 24036 | 8/1970 | Japan | 219/243 |
| 56-208 | 1/1981 | Japan | 156/583.1 |
| 1,060,209 | 3/1967 | United Kingdom | 219/243 |

*Primary Examiner*—Anthony Bartis
*Attorney, Agent, or Firm*—Steele, Gould & Fried

[57] ABSTRACT

A device for welding foils, webs or bags having differing thickness along a line to be welded at right angles to a conveying direction includes a pair of elongated welding dies movable relative to one another and one of which has an elongated, periodically heatable electric resistance heating element having serially-connected sections of differing electrical resistance along its length defined by zonal variations in cross sectional area of the heating element, e.g., areas of differing heating element width. Each section of differing resistance corresponds in length and position to the differing thickness along the line to be welded and is so dimensioned that, prior to initial contact with that line to be welded, the heating element has a higher temperature in the zones of lesser cross-sectional area corresponding to the thicker areas of the line to be welded than at a the at the zones of greater cross sectional area corresponding to the thinner areas thereof. The zonal variations in cross-sectional area are so dimensioned that the heating element has a constant temperature over its entire length immediately after contacting te line to be welded to form a continuous weld.

7 Claims, 3 Drawing Figures

DEVICE FOR WELDING FOILS HAVING DIFFERENT THICKNESS ALONG A WELD LINE

BACKGROUND OF THE INVENTION

The present invention relates to a device for welding foils, films or sheets in web or bag form, with welding dies at right angles to the conveying direction of the foil and movable relative to one another, as well as with a periodically heatable resistance heating element.

In the case of welding devices of this type, continuously provided foil webs, particularly tubes, are welded to form bags and/or the bags are sealed. The foil web or bag is conveyed until the point to be welded is located between the welding dies. The heating element is heated and the foil web is jammed between the welding dies. The heat of the heating element is transferred to the foil and leads to the heat sealing thereof. The heating element and the foil must then cool, so that the weld becomes solid and only then can a further transfer take place.

Limits are placed on any increase to the production rate of such devices as a result of the heating and cooling times. For the purpose of increasing the production rate, it is known (DE-OS No. 3,024,517) to provide two fixed, heatable welding dies and to arrange reciprocatable welding dies between them. Thus, whilst cooling is taking place at one welding location, a transfer process can take place in the other welding location.

SUMMARY OF THE INVENTION

The problem of the present invention is to provide a device for welding foils, which makes it possible to further reduce the cycle time, without reducing the welding quality.

According to the invention, this problem is solved in that in the case of foil webs or bags with differing thicknesses along the weld line and in particular with different numbers of layers in the foil, the heating element is heatable in such a way that prior to the welding process at the points of greater thickness of the foil web it has a higher temperature than that at the points of less thickness of the foil web.

The inventor of the present device has found that in the case of the known welding devices the heating element, which has a uniform temperature, is cooled to a varying degree during welding as a result of the different thickness of the foil and as a result there is a different temperature profile in the heating element during the welding process. As a result, in the thinner area, the foil receives too much heat, or in the thicker area too little heat, so that in one area welding can be incomplete and in another area can be excessive, so that the weld does not have an overall satisfactory quality. As in the case of the required short cycle times, the cooling time of the heating element is short, on reheating, the temperature profile present at the end of the welding process would be renewed, so that there would be an overal build-up, which further decreases the weld quality.

However, in the case of the present invention, the heating element is heated to a lesser extent in the area where the foil is thinner, so that there is no longer a risk of the weld tearing in this area. In the areas where the foil is thicker, a higher temperature is set, so that adequate welding is always ensured.

The invention also proposes that the temperature of the heating element is selected or set in such a way that it has a uniform temperature over its entire length, after starting the welding process. The areas of the heating elements which have a higher temperature before the start of the welding process are consequently cooled to the same temperature during welding as the remaining areas of the heating element. Thus, the heating element has the same temperature during and after the welding process. On reheating, the desired temperature profile can be reliably achieved again with simple measures.

There are various possibilities for permitting the setting of a given temperature profile. Thus, the heating element can e.g. comprise portions made from different resistance materials, so that as a result of the different electrical resistance for the same current different temperatures occur in a zonal manner. However, it is particularly advantageous if the heating element, preferably in the form of a strip heater, has a different cross-section over its length, the cross-section being smaller at the points where the foil is thicker than at the points where the foil is thinner. Thus, the zonally different temperaure can also be achieved by a zonally different electrical resistance, but the heating element or strip heater can be in one piece and made from one material.

The differing cross-section of the heating element or strip heater in a particularly advantageous manner makes it possible for it to have a different width, although the thickness is the same. The constant thickness over the heating element length ensures that no projections on the heating element can influence the foil or foil pressing. Welding is not impaired by the different width of the heating element, because the width differences are only small.

The device proposed by the invention makes it possible by using simple means to adapt to different foil webs or bags with varying widths. For this purpose, the heating element can be arranged interchangeably. Thus, if a wider or differently folded foil web or a different bag is to be worked, it is merely necessary to replace the existing heating element by another heating element adapted to the specific foil shape.

The invention can be advantageously used in the case of processing a tubular foil with lateral folds. When producing bags with lateral folds, use is made of tubular foils having inwardly directed lateral folds on both longitudinal edges. Thus, in the vicinity of the lateral folds, the foil web is in four-layer form, whereas in the central area between the lateral folds two foil webs are superimposed. The invention can be used with particularly advantages in the case of foils, in which certain areas have double the thickness as a result of the four layers. The device proposed by the invention can be used not only for producing the bag from the foil web, but also for sealing the bag.

It is particularly preferable for the welding temperature of the heating element to be regulatable or controllable by means of a resistance measurement.

BRIEF DESCRIPTION OF THE DRAWINGS

The invention is described in greater detail hereinafter relative to non-limitative embodiments and the attached drawings, wherein show.

DETAILED DESCRIPTION OF THE INVENTION

Figure 1:
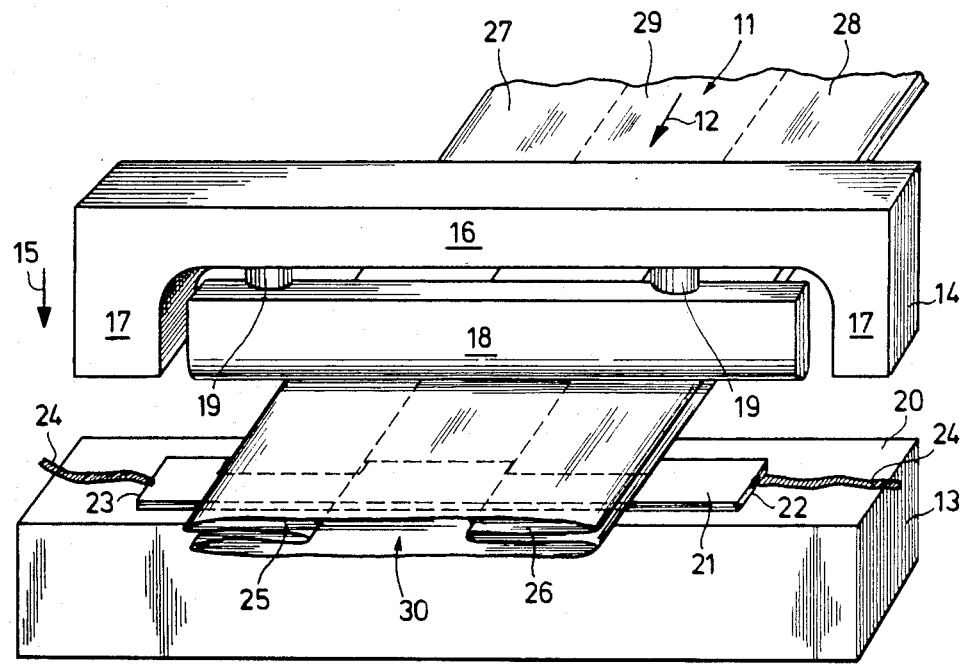
FIG. 1 diagrammatically and in simplified form, a perspective view of two welding dies with a tubular foil.

FIG. 1 diagrammatically and perspectively shows a part of a welding device constructed according to the invention. A foil web 11 or bag is conveyed forwards in the direction of arrow 12 by not shown conveying and holding means. Conveying takes place in an intermittent manner. The foil web 11 is moved between two welding dies 13, 14, which are arranged at right angles to the conveying direction and run parallel to the pplane in which the foil web 11 is located.

The lower welding die 13 is diagrammatically represented as a bar, which has approximately the same length as the upper welding die 14. Welding die 14 is positioned above welding die 13, the arrangement being such that the two welding dies 13, 14 can be moved towards one another. Preferably the lower welding die 13 is fixed, whilst the upper welding die 14 can be moved downwards in the direction of arrow 15. The upper welding die 14 is bow-shaped, the bow being formed from an elongated portion 16 running parallel to the welding die and two short shoulders which are directed perpendicularly downwards. Between shoulder 17 and parallel portion 16 is arranged a pressing member 18 applied with the aid of two pins 19 to the bottom of the parallel portion 16 of the upper welding die 14. Together with the movement of the upper welding die 14, the pressing member 18 is moved upwards or downwards, downward movement being possible until the pressing member can press the foil web 11 against the top 20 of the lower welding die 13.

A heating element 21 is fitted to the top 20 of the lower welding die 13. Heating element 21 is constructed as a resistance heating element and is in the form of a strip heater. A connection 24 is diagrammatically represented at the right-hand end 22 and the left-hand end 23 in FIG. 1 and by means of said connections the current can be supplied through the heating element 21. The latter has the same thickness over its entire length whilst it has differing widths in the vicinity of foil web 11.

Foil web 11 is formed by a tubular foil with two lateral folds 25, 26, which have the same widths. In the area 27 of foil web 11 where the lateral fold 25 is located, heating element 21 has a reduced width and this also applies to the foil web area 28 in which lateral fold 26 is located.

In the central area 29 of foil web 11, which is located between the two lateral folds 25, 26, the width of heating element 21 exceeds the width in areas 27 and 28.

As can be seen on the front edge 30 of the foil web 11, in area 27 of lateral fold 25 and area 28 of lateral fold 26, foil web 11 has four superimposed layers, whereas in area 29, i.e. between areas 27 and 28 it only has two layers.

If heating element 21 is connected with the aid of connections 24 to a circuit, a constant current flows through heating element 21. As a result of the reduced cross-section of heating element 21 in foil areas 27 and 28, a higher electrical resistance prevails there, so that the current in said area leads to a greater heating of heating element 21. On pressing the pressing member 18 against the lower welding die 13, a greater cooling of heating element 21 takes place in areas 27 and 28 as a result of the greater mass and this is compensated by the higher temperature of heating element 21 in this area.

Heating element 21 is shown in FIG. 1 with an exaggerated width and in an actual embodiment, the width of the strip heater is approximately 4 to 6 mm, whilst its thickness is in the range 0.1 to 0.2 mm.

FIG. 2 once again shows in greatly simplified form, a plan view of a foil web in the form of a tubular foil 31 with two lateral folds 25, 26. Tubular foil 31 therefore contains an upper web 32 and a lower web 33, between which are located in the lateral area the in each case two webs of the two lateral folds 25, 26. The longitudinal edges 34, 35 of lateral folds 25, 26 are parallel to the longitudinal direction and to the lateral edges of tubular foil 31.

Figure 2:
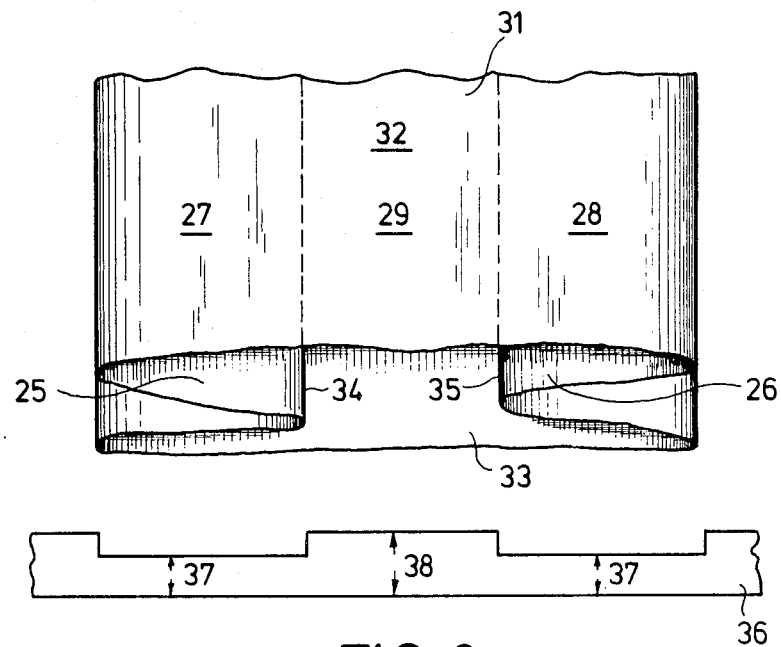
FIG. 2 in simplified form, a plan view of a heating element and a lateral fold tube.

FIG. 2 also shows a plan view of a strip heater 36, whose width varies. Corresponding to the arrangement of area 27 of tubular foil 31, width 37 is made less than width 38 of the central area 29 of tubular foil 31, wherein the latter is in two-layer form.

If current flows through the strip heater 36 according to FIG. 2, as a result of the smaller width 37, a higher temperature is obtained than in the area of width 38. As a result, tubular foil 31 is welded at the same time and with the same quality both in areas 27, 28 where it is in four-layer form and in area 29 where it is in two-layer form.

Figure 3:
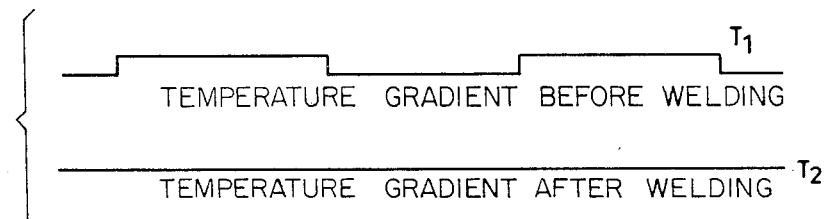
FIG. 3 a diagram of the temperature gradients in the heating element before and during welding.

FIG. 3 shows the temperature profile along heating element 21 or strip heater 36 in FIGS. 1 and 2. Curve $T_1$ shows the temperature gradient in heating element 21 or strip heater 36 before the start of welding. It can be clearly seen that in the area of reduced width 37, the temperature is higher than in the area of increased width 38.

On contact between heating element 21 and foil web 11, as a result of the greater thermal capacity in the four-layer area, the temperature drops more than in the two-layer area. Thus, during welding, the temperature profile represented by curve $T_2$ in FIG. 3 is obtained, namely the same temperature over the entire length of heating element 21. Curve $T_1$ in FIG. 3 is drawn to the same scale as the strip heater 36 and tubular foil 31 in FIG. 2. Thus, the points of the temperature jumps of curves $T_1$ correspond precisely to the points of the width changes of the strip heater 36 in FIG. 2.

What is claimed is:

1. A device for welding foils, webs and bags having differing thickness along a line to be welded at right angles to a conveying direction, the device comprising:
welding dies at right angles to the conveying direction and which dies are movable relative to one another, one of said dies having an elongated periodically heatable electric resistance heating element aligned at right angles to the conveying direction, said heating element being a continuous strip having a plurality of adjacent serially-connected sections of differing widths, the sections having different electrical resistances as a result of their differing widths, the heating element being connectable to an electric potential and thereby heatable to a plurality of different elevated temperatures along an entire length of the heating element so that, prior to contacting the line to be welded, the heating element has a higher temperature in sections of lesser width, said sections of lesser width corresponding in length and location to the thicker areas along the line to be welded, whereby the heating element is adapted to initially apply the higher temperature to the thicker areas and a lower elevated temperature to the thinner areas, the differing widths of the sections of the heating element being dimensioned such that the heating element has a constant temperature over its entire length immediately after contacting the line to be welded and forms a continuous weld.

2. A device according to claim 1, wherein the serially-connected sections of the heating element are parts of an integral resistance heating element through which flows a current.

3. A device according to claim 2, wherein each of the sections of the heating element reaches a relative welding temperature determined by its relative resistance.

4. A device according to claim 1, wherein the heating element is interchangeable.

5. A device according to claim 1, wherein said differing widths of the sections are dimensioned for a tubular foil with lateral folds, the sections of lesser width being spaced to correspond to the lateral folds.

6. A device according to claim 1, wherein said differing widths of the sections are dimensioned for a bag with lateral folds, the sections of lesser width being spaced to correspond to the lateral folds.

7. A device for welding foil, webs or bags, which comprises:
a pair of welding dies at right angles to a conveying direction of a foil, a web or a bag having differing thickness along a line to be welded at right angles to the conveying direction, the dies being movable relative to one another, one of said dies having an elongated periodically heatable electric resistance heating element, said heating element being positioned at right angles to the conveying direction and having zonally different areas of electrical resistance along its length, the areas being defined by zonal variations in cross-sectional area of the heating element, each zonal variation corresponding in length and position to said differing thickness along the line to be welded, the heating element being heatable over its entire length, and the zonal variations in cross-sectional area being dimensioned so that prior to initially contacting the line to be welded, the heating element has a higher temperature in zones, of lesser cross-sectional area at the thicker areas of the line to be welded than an elevated temperature at the zones of greater cross-sectional area at the thinner areas of the line to be welded, the variations in cross-sectional area of the heating element being adapted to correspond to the differing thickness along the line to be welded, the zonal variations in cross-sectional area of the heating element being dimensioned such that the heating element has a constant temperature over its entire length immediately after contacting the line to be welded, whereby the device forms a continuous weld.

* * * * *